(12) United States Patent
Hanano (10) Patent No.: US 7,319,285 B2
(45) Date of Patent: Jan. 15, 2008

(54) OPTICAL DEVICE, ILLUMINATION APPARATUS USING THE DEVICE, AND PROJECTOR USING THE ILLUMINATION APPARATUS

(75) Inventor: Kazunari Hanano, Hachioji (JP)

(73) Assignee: Olympus Corporation, Tokyo (JP)

( * ) Notice: Subject to any disclaimer, the term of this patent is extended or adjusted under 35 U.S.C. 154(b) by 520 days.

(21) Appl. No.: 10/918,639

(22) Filed: Aug. 12, 2004

(65) Prior Publication Data
US 2005/0046807 A1    Mar. 3, 2005

(30) Foreign Application Priority Data
Aug. 25, 2003    (JP)    ............... 2003-300265

(51) Int. Cl.
 *G02B 6/00*    (2006.01)
(52) U.S. Cl. ...................... 313/111; 362/551
(58) Field of Classification Search ............... 362/560, 362/551, 427, 431; 313/110, 111; 353/30–37
See application file for complete search history.

(56) References Cited

U.S. PATENT DOCUMENTS

| | | | | |
|---|---|---|---|---|
| 3,801,181 | A * | 4/1974 | Kitano et al. ............... | 359/652 |
| 5,829,858 | A * | 11/1998 | Levis et al. .................. | 353/122 |
| 6,129,437 | A | 10/2000 | Koga et al. | |
| 6,139,156 | A | 10/2000 | Okamori et al. | |
| 6,272,269 | B1 * | 8/2001 | Naum ........................ | 385/43 |
| 6,560,397 | B1 * | 5/2003 | Ehlers et al. ............... | 385/146 |
| 6,595,673 | B1 * | 7/2003 | Ferrante et al. ............. | 362/551 |
| 6,715,880 | B2 * | 4/2004 | Shouji ......................... | 353/20 |
| 2002/0122621 | A1 * | 9/2002 | Li ............................... | 385/31 |
| 2003/0031029 | A1 * | 2/2003 | Kawaai et al. .............. | 362/551 |

FOREIGN PATENT DOCUMENTS

| | | |
|---|---|---|
| EP | 1 241 510 A1 | 9/2002 |
| JP | 58150903 | 9/1983 |
| JP | 58182610 | 10/1983 |
| JP | 60079322 | 5/1985 |
| JP | 04333803 | 11/1992 |
| JP | 11-32278 | 2/1999 |
| JP | 2003090939 | 3/2003 |

* cited by examiner

*Primary Examiner*—K Guharay
*Assistant Examiner*—Christopher M. Raabe
(74) *Attorney, Agent, or Firm*—Volpe & Koenig PC (57) ABSTRACT

An optical device which leads light beams emitted by a light source to a predetermined illumination area comprises first and second light leading members. The first light leading member includes a first incident surface configured to be entered the light beams emitted by the light source and a first outgoing radiation surface configured to emit the light beams. The second light leading member includes a second incident surface configured to be entered the light beams emitted from the first outgoing radiation surface of the first light leading member and a second outgoing radiation surface configured to emit the light beams. The first outgoing radiation surface has a shape different from that of the first incident surface. The second outgoing radiation surface has a shape different from that of the second incident surface.

17 Claims, 7 Drawing Sheets

OPTICAL DEVICE, ILLUMINATION APPARATUS USING THE DEVICE, AND PROJECTOR USING THE ILLUMINATION APPARATUS

CROSS-REFERENCE TO RELATED APPLICATIONS

This application is based upon and claims the benefit of priority from prior Japanese Patent Application No. 2003-300265, filed Aug. 25, 2003, the entire contents of which are incorporated herein by reference.

BACKGROUND OF THE INVENTION

1. Field of the Invention

The present invention relates to an optical device which leads light beams emitted from a light source to a predetermined illumination area, an illumination apparatus which illuminates a predetermined illumination target surface by using such an optical device, and a projector which projects an image by using such an optical device.

2. Description of the Related Art

Various kinds of optical devices which lead light beams emitted from a light source to a predetermined illumination area have been conventionally proposed.

For example, U.S. Pat. No. 5,829,858 discloses an optical device which leads light beams from a light source which have entered an incident surface, and allows them to be emitted from an outgoing radiation surface. This optical device is used to illuminate a rectangular illumination area in cases where a lamp which emits light beams with a circular light distribution with respect to the incident surface is a light source. Therefore, this optical device has a structure that the incident surface has a circular or octagonal shape and the outgoing radiation surface has a rectangular shape.

Further, U.S. Pat. No. 6,139,156 also discloses a tapered optical device having a structure that an incident surface has a circular shape and an outgoing radiation surface has a rectangular shape.

On the other hand, a light emitting diode (which will be abbreviated as an LED hereinafter) has recently wined considerable attention as a small light source for coming generation. The LED has advantages such as smallness in size, resistance characteristics, a long duration of life or the like. However, because of a restriction in its light emission efficiency and light emission output, the conventional LED is mainly used as an indicator illumination lamp for various gauges and the like or a control state confirmation lamp. However, in recent years, the light emission efficiency of the LED has been rapidly improved, and it is said that it is a matter of time before this light emission efficiency exceeds the light emission efficiency of a high pressure mercury lamp or a fluorescent lamp which has been conventionally considered as a discharge type lamp with the highest light emission efficiency.

BRIEF SUMMARY OF THE INVENTION

According to a first aspect of the present invention, there is provided an optical device which leads light beams emitted by a light source to a predetermined illumination area, comprising:
a first light leading member including:
a first incident surface configured to be entered the light beams emitted by the light source;
a first reflection surface comprising at least one surface configured to reflect a part of the light beams which enter the first incident surface; and
a first outgoing radiation surface configured to emit the light beams reflected on the first reflection surface and a part of the light beams which enter the first incident surface, the first outgoing radiation surface having a shape different from that of the first incident surface; and
a second light leading member including:
a second incident surface configured to be entered the light beams emitted from the first outgoing radiation surface of the first light leading member;
a second reflection surface comprising at least one surface configured to reflect a part of the light beams which enter the second incident surface; and
a second outgoing radiation surface configured to emit the light beams reflected on the second reflection surface and a part of the light beams which enter the second incident surface, the second outgoing radiation surface having a shape different from that of the second incident surface.

According to a second aspect of the present invention, there is provided an illumination apparatus which illuminates a predetermined irradiation target surface, comprising:
a light source configured to emit light beams;
an optical device which leads light beams emitted by the light source to a predetermined illumination area, including:
a first light leading member including:
a first incident surface configured to be entered the light beams emitted by the light source;
a first reflection surface comprising at least one surface configured to reflect a part of the light beams which enter the first incident surface; and
a first outgoing radiation surface configured to emit the light beams reflected on the first reflection surface and a part of the light beams which enter the first incident surface, the first outgoing radiation surface having a shape different from that of the first incident surface; and
a second light leading member including:
a second incident surface configured to be entered the light beams emitted from the first outgoing radiation surface of the first light leading member;
a second reflection surface comprising at least one surface configured to reflect a part of the light beams which enter the second incident surface; and
a second outgoing radiation surface configured to emit the light beams reflected on the second reflection surface and a part of the light beams which enter the second incident surface, the second outgoing radiation surface having a shape different from that of the second incident surface; and
an illumination optical member configured to have an optically conjugate positional relationship between the second outgoing radiation surface of the second light leading member in the optical device and the predetermined irradiation target surface.

According to a third aspect of the present invention, there is provided a projector comprising:
an illumination apparatus which illuminates a predetermined irradiation target surface, including:
a light source configured to emit light beams;
an optical device which leads light beams emitted by the light source to a predetermined illumination area, comprising:
a first light leading member including:
a first incident surface configured to be entered the light beams emitted by the light source;

a first reflection surface comprising at least one surface configured to reflect a part of the light beams which enter the first incident surface; and a first outgoing radiation surface configured to emit the light beams reflected on the first reflection surface and a part of the light beams which enter the first incident surface, the first outgoing radiation surface having a shape different from that of the first incident surface; and a second light leading member including:

a second incident surface configured to be entered the light beams emitted from the first outgoing radiation surface of the first light leading member;

a second reflection surface comprising at least one surface configured to reflect a part of the light beams which enter the second incident surface; and a second outgoing radiation surface configured to emit the light beams reflected on the second reflection surface and a part of the light beams which enter the second incident surface, the second outgoing radiation surface having a shape different from that of the second incident surface; and an illumination optical member configured to have an optically conjugate positional relationship between the second outgoing radiation surface of the second light leading member in the optical device and the predetermined irradiation target surface;

a display device arranged on the irradiation target surface; and a projection optical system configured to project an image formed by the display device onto a screen, the light source being an LED which emits light beams from a light emission surface thereof, and both the first incident surface shape in the first light leading member and a light emission surface shape of the LED being quadrangles.

According to a fourth aspect of the present invention, there is provided an optical device which leads light beams emitted by a light source to a predetermined illumination area, comprising:

first light leading means including:

a first incident surface for being entered the light beams emitted by the light source;

a first reflection surface comprising at least one surface for reflecting a part of the light beams which enter the first incident surface; and a first outgoing radiation surface for emitting the light beams reflected on the first reflection surface and a part of the light beams which enter the first incident surface, the first outgoing radiation surface having a shape different from that of the first incident surface; and second light leading means including:

a second incident surface for being entered the light beams emitted from the first outgoing radiation surface of the first light leading means;

a second reflection surface comprising at least one surface for reflecting a part of the light beams which enter the second incident surface; and a second outgoing radiation surface for emitting the light beams reflected on the second reflection surface and a part of the light beams which enter the second incident surface, the second outgoing radiation surface having a shape different from that of the second incident surface.

According to a fifth aspect of the present invention, there is provided an illumination apparatus which illuminates a predetermined irradiation target surface, comprising:

a light source for emitting light beams;

an optical device for leading light beams emitted by the light source to a predetermined illumination area, including:

first light leading means including:

a first incident surface for being entered the light beams emitted by the light source;

a first reflection surface comprising at least one surface for reflecting a part of the light beams which enter the first incident surface; and a first outgoing radiation surface for emitting the light beams reflected on the first reflection surface and a part of the light beams which enter the first incident surface, the first outgoing radiation surface having a shape different from that of the first incident surface; and second light leading means including:

a second incident surface for being entered the light beams emitted from the first outgoing radiation surface of the first light leading means;

a second reflection surface comprising at least one surface for reflecting a part of the light beams which enter the second incident surface; and a second outgoing radiation surface for emitting the light beams reflected on the second reflection surface and a part of the light beams which enter the second incident surface, the second outgoing radiation surface having a shape different from that of the second incident surface; and illumination optical means for having an optically conjugate positional relationship between the second outgoing radiation surface of the second light leading member in the optical device and the predetermined irradiation target surface.

According to a sixth aspect of the present invention, there is provided a projector comprising:

an illumination apparatus for illuminating a predetermined irradiation target surface, including:

a light source for emitting light beams;

an optical device for leading light beams emitted by the light source to a predetermined illumination area, including:

first light leading means including:

a first incident surface for being entered the light beams emitted by the light source;

a first reflection surface comprising at least one surface for reflecting a part of the light beams which enter the first incident surface; and a first outgoing radiation surface for emitting the light beams reflected on the first reflection surface and a part of the light beams which enter the first incident surface, the first outgoing radiation surface having a shape different from that of the first incident surface; and second light leading means including:

a second incident surface for being entered the light beams emitted from the first outgoing radiation surface of the first light leading means;

a second reflection surface comprising at least one surface for reflecting a part of the light beams which enter the second incident surface; and a second outgoing radiation surface for emitting the light beams reflected on the second reflection surface and a part of the light beams which enter the second incident surface, the second outgoing radiation surface having a shape different from that of the second incident surface; and illumination optical means for having an optically conjugate positional relationship between the second outgoing radiation surface of the second light leading member in the optical device and the predetermined irradiation target surface;

a display device arranged on the irradiation target surface; and a projection optical system for projecting an image formed by the display device onto a screen, the light source being an LED which emits light beams from a light emission surface thereof, and both the first incident surface shape in the first light leading means and a light emission surface shape of the LED being quadrangles.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

Figure 1:
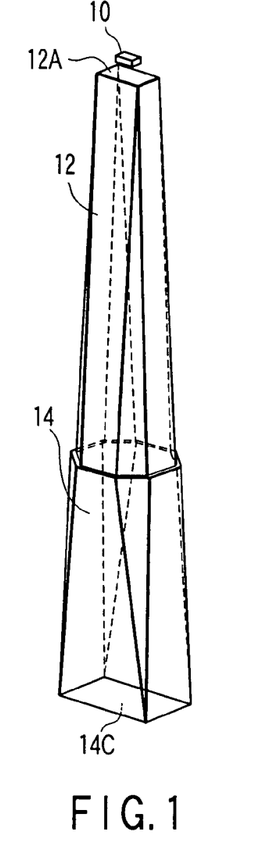
FIG. 1 is a perspective view showing a structure of an optical device according to a first embodiment of the present invention.
Figure 2:
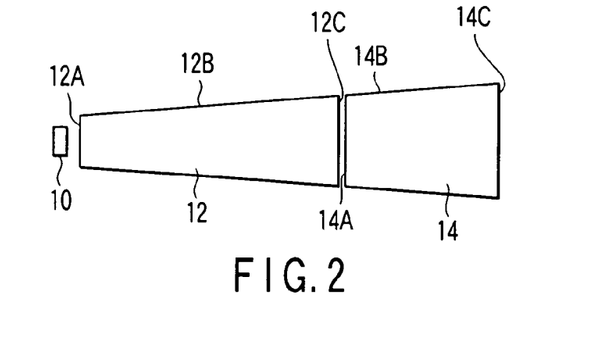
FIG. 2 is a cross-sectional view showing the structure of the optical device according to the first embodiment.

As shown in FIGS. 1 and 2, an optical device according to a first embodiment of the present invention is an optical device which leads light beams emitted by an LED 10 as a light source to a predetermined illumination area. This comprises a first rod 12 as a first light leading member and a second rod 14 as a second light leading member.

Here, the first rod 12 is formed of glass or the like to have a solid core. This first rod 12 has an incident surface 12A which is a first incident surface from which light beams emitted by the LED 10 enter. Further, it includes a side surface 12B as a first reflection surface comprising at least one surface on which a part of the light beams which have entered the incident surface 12A are reflected. Furthermore, it includes an outgoing radiation surface 12C as a first outgoing radiation surface from which the light beams reflected on this side surface 12B and a part of the light beams which entered the incident surface 12A advance. It is to be noted that a shape of the incident surface 12A is a quadrangle corresponding to a shape of the LED 10, and the outgoing radiation surface 12C is configured to have a regular octagonal shape.

Moreover, the second rod 14 is also formed of glass or the like to have a solid core, and arranged with a predetermined gap from the outgoing radiation surface 12C of the first rod 12. The second rod 14 has an incident surface 14A as a second incident surface from which the light beams advancing from the outgoing radiation surface 12C of the first rod 12 enter. Additionally, the second rod 14 includes a side surface 14B as a second reflection surface comprising at least one surface on which a part of the light beams which have entered the incident surface 14A are reflected. Further, it includes an outgoing radiation surface 14C as a second outgoing radiation surface from which the light beams reflected on this side surface 14B and a part of the light beams which entered the incident surface 14A advance. It is to be noted that a shape of the incident surface 14A is a regular octagonal shape corresponding to a shape of the outgoing radiation surface 12C of the first rod 12, and the outgoing radiation surface 14C is configured to have a quadrangular shape.

According to the optical device having such a structure, each of the incident surface 12A of the first rod 12 and the outgoing radiation surface 14C of the second rod has a quadrangular shape. Therefore, light beams can be efficiently taken in with respect to the LED 10 which is a rectangular light source, and light beams can be efficiently led to an illumination object having a rectangular shape. Furthermore, the shape of the incident surface 12A of the first rod 12 is different from that of the incident surface 14A of the second rod 14, and the shape of the outgoing radiation surface 12C of the first rod 12 is different from the shape of the outgoing radiation surface 14C of the second rod 14. As a result, even if a light source like the LED 10 having the anisotropy in luminous intensity distribution characteristics is used, the luminous intensity distribution anisotropy of the outgoing light beams of the second rod 14 is alleviated, and a luminous intensity distribution with irregularities in intensity distribution being suppressed can be realized.

It is to be noted that the term "luminous intensity distribution anisotropy" used herein means that an angular intensity distribution of light beams emitted by the light source differs in directions on the incident surface. That is, for example, when the light source emits light beams with an elliptic light distribution which is wide in a given direction with respect to the incident surface and narrow in a direction orthogonal to this direction, it can be said that the light source has the luminous intensity distribution anisotropy. In this embodiment, even if a light source having such a luminous intensity distribution anisotropy is used, the luminous intensity distribution anisotropy of the light beams advancing from the outgoing radiation surface can be alleviated. It is to be noted that U.S. Pat. No. 6,139,156 mentioned above discloses a combined use of two light leading members. However, since the incident surface and the outgoing radiation surface have the same shape in the respective members, the luminous intensity distribution anisotropy of the light beams advancing from the outgoing radiation surface cannot be alleviated.

Figure 3A:
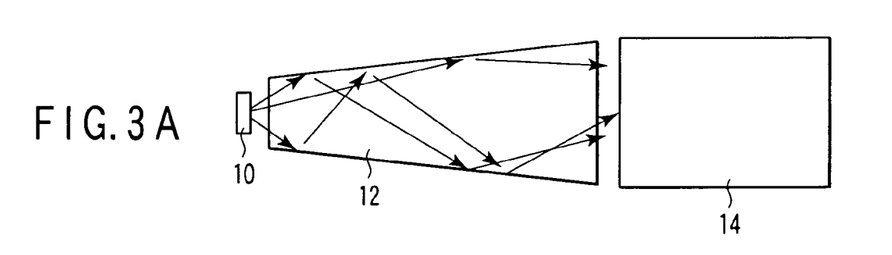
FIG. 3A is a view illustrating a relationship between shapes of first and second rods and light beams which leak without entering the second rod.
Figure 3B:
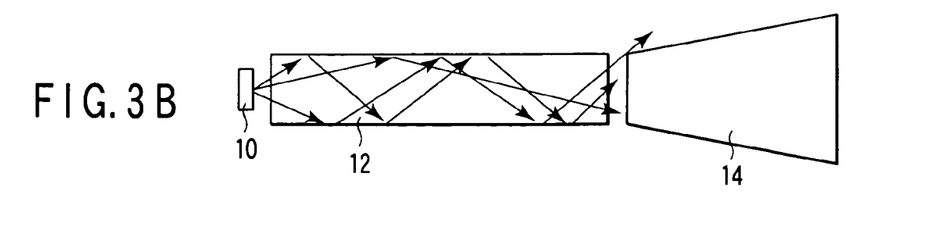
FIG. 3B is a view illustrating a relationship between other shapes of the first and second rods and light beams which leak without entering the second rod.

Furthermore, if a gap is formed between the outgoing radiation surface 12C of the first rod 12 and the incident surface 14A of the second rod 14, there is a possibility that the light beams advancing from the outgoing radiation surface 12C leak without entering the incident surface 14A. For example, each of FIGS. 3A and 3B shows the optical device having a structure in which the outgoing radiation surface 12C of the first rod 12 an the incident surface 14A of the second rod 14 have the same size. In this case, the first rod 12 is formed as a taper rod in which its outgoing radiation surface 12C is larger than its incident surface 12A in the optical device shown in FIG. 3A. By adopting this structure, the maximum outgoing radiation angle of the light beams on the outgoing radiation surface 12C becomes small due to the NA conversion effect, and a quantity of light beams advancing toward the outside of the incident surface 12A of the second rod 14 is small. On the contrary, when the first rod 12 is configured as such a parallel rod as shown in FIG. 3B, the maximum outgoing radiation angle of the light beams on the outgoing radiation surface 12C is large. Therefore, even if the same gap (clearance) as that in FIG. 3A is adopted, a quantity of the light beams which deviate from the incident surface 14A of the second rod 14, i.e., the light beams which leak becomes larger than that in the case depicted in FIG. 3A.

Thus, in the optical device according to the first embodiment, as shown in FIGS. 1 and 2, the first rod 12 is configured as a tapered rod in which its outgoing radiation surface 12C is larger than its incident surface 12A. Moreover, the second rod 14 is also configured as a tapered rod in which its outgoing radiation surface 14C is larger than its incident surface 14A. Therefore, the NA conversion effect can be provided twice, the light beams with the small maximum outgoing radiation angle, i.e., the light beams with the high parallelism can be obtained from the outgoing radiation surface 14C of the tapered second rod 14.

Figure 4:
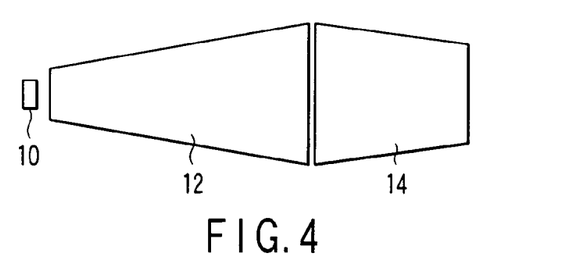
FIG. 4 is a cross-sectional view showing a structure of a modification of the optical device according to the first embodiment.

Of course, the present invention is not restricted thereto. For example, as shown in FIG. 4, the first rod 12 may be configured as a tapered rod in which its outgoing radiation surface 12C is larger than its incident surface 12A, and the second rod 14 may be configured as an inverse-tapered rod in which its outgoing radiation surface 14C is smaller than its incident surface 14A. By adopting such a structure, since the outgoing radiation surface 12C of the first rod 12 can be enlarged, the NA conversion efficiency of the first rod 12 can be increased and, consequently, a quantity of leaking light beams can be reduced when the light beams enter the second rod 14 from the first rod 12.

Figure 5:
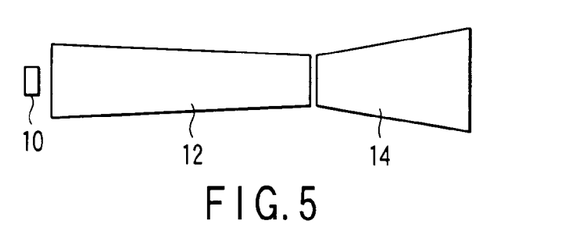
FIG. 5 is a cross-sectional view showing a structure of another modification of the optical device according to the first embodiment.

Alternatively, as shown in FIG. 5, the first rod 12 may be configured as an inverse-tapered rod in which its outgoing radiation surface 12C is smaller than its incident surface 14, and the second rod 14 may be configured as a tapered rod in which its outgoing radiation surface 14C is larger than its incident surface 14A. If such a structure is adopted, since the incident surface 12A of the first rod 12 can be enlarged, it is possible to cope with a light source with a large light emission surface.

Figure 6:
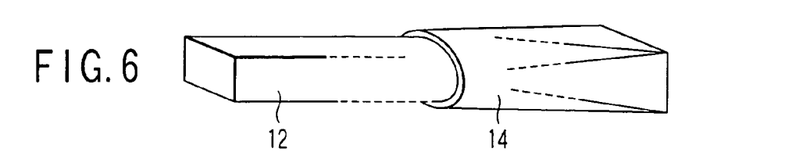
FIG. 6 is a cross-sectional view showing a structure of still another modification of the optical device according to the first embodiment.

Additionally, the outgoing radiation surface 12C of the first rod 12 and the incident surface 14A of the second rod 14 are not restricted to the above-described regular octagonal shape. For example, as shown in FIG. 6, they may have a circular shape. That is, they may have a circular shape or a polygonal shape having five or more angles as long as the incident surface 12A of the first rod 12 has a shape different from that of the outgoing radiation surface 14C of the second rod 14 and the outgoing radiation surface 12C of the first rod 12 and the incident surface 14A of the second rod 14 have similar shapes.

Further, although the first and second light leading members are the solid rods, at least one of these members may be a hollow rod having a reflection surface on an inner surface thereof.

It is to be noted that the tapered shape or the inverse-tapered shape means a shape as seen from a given cross section in this specification, and the incident surface shape is different from the outgoing radiation surface shape. Therefore, attention should be paid to the fact that the shape becomes a reversed shape or a non-tapered shape when seen from another cross section.

Second Embodiment

An optical device having a structure in which the first light leading member is relatively rotatable with respect to the second light leading member and an illumination apparatus using this optical device will now be described as a second embodiment according to the present invention.

Figure 7:
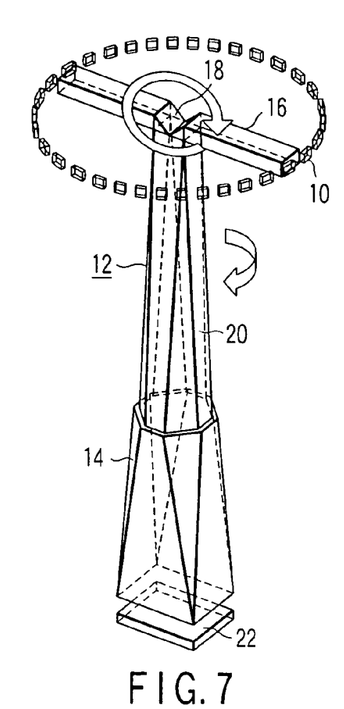
FIG. 7 is a perspective view showing a structure of an illumination apparatus using an optical device according to a second embodiment of the present invention.

As shown in FIG. 7, in the optical device according to this second embodiment, like the first embodiment, an incident surface 12A of a first rod 12 as a first light leading member is configured to have a quadrangular shape, and an outgoing radiation surface 12C of the same is configured to have a regular octagonal shape. Further, an incident surface 14A of a second rod 14 as a second light leading member is configured to have a regular octagonal shape, and an outgoing radiation surface 14C of the same is configured to have a quadrangular shape (rectangular shape). In this embodiment, however, the first rod 12 is formed as a T-shaped rod. This T-shaped rod comprises three kinds of members, i.e., two incident rods 16 each having a prismatic shape, two bending prisms 18 each of which has a reflection coat applied on an inclined surface thereof and is used to bend a light path, and a taper rod 20 whose cross-sectional shape is gradually changed from a rectangular shape to a regular octagonal shape and whose side surfaces have a tapered shape.

An illumination apparatus using the optical device having such a structure utilizes as a light source, e.g., a plurality LEDs 10 arranged on an inner wall surface of a non-illustrated cylinder in such a manner that their light emitting surfaces are directed toward the inside of the cylinder. In this case, an incident surface of each incident rod 16 which serves as the incident surface 12A of the first rod 12 mentioned above is arranged to be opposed to the light emitting surfaces of the plurality of LEDs 10. Furthermore, the first rod 12 is rotated in a direction indicated by an arrow, and the LEDs 10 placed at incident surface positions of the both incident rods 16 which move with this rotation are sequentially turned on. By doing so, light beams are continuously emitted from the outgoing radiation surface 14C of the fixedly supported second rod 14, and continuously applied on a transmission type LCD 22 as an illumination target arranged in a predetermined illumination area.

Figure 8:
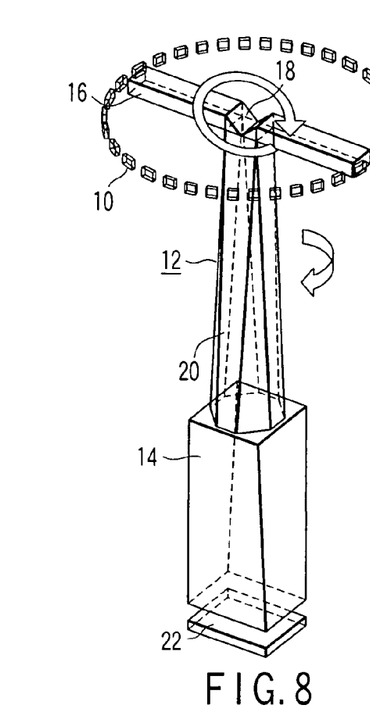
FIG. 8 is a perspective view showing a structure of a modification of the illumination apparatus using the optical device according to the second embodiment.

In FIG. 8, as a modification of the second embodiment, the second rod 14 has a structure in which its incident surface 14A has a square shape which covers the regular octagonal outgoing radiation surface shape of the first rod 12, and its outgoing radiation surface 14C has a quadrangular shape (rectangular shape).

A difference in effect caused due to a difference in shape of such a second rod 14 will now be described hereinafter while taking concrete examples of numeric figures.

For example, it is assumed that a plurality of LEDs 10 each having a light emitting surface of 1 mm×1 mm are circumferentially arranged with a 1.5 mm pitch in such a manner that their light emitting surfaces face the inner side. In this case, the two incident rods 16 of the T-shaped rod as the first rod 12 are configured to be opposed to each other in such a manner that each has a length of 12 mm, an incident surface size of 3 mm×1.5 mm and a circumferential direction becomes a long side. These incident rods 16 are bonded to the bending prisms 18, and two pairs of the incident rods 16 and the bending prisms 18 are bonded to the taper rod 20. A size of an orthogonal surface of the bending prism 18 is equal to that of the incident surface of the incident rod 16, the surface of the taper rod 20 bonded to the bending prism 18 has a size of 3 mm×3 mm, and an outgoing radiation surface of the same has a regular octagonal shape with a circumscribing circle diameter of 5.9 mm and has a length of 37.5 mm. It is to be noted that, in the first rod 12, the incident rod 16 and the taper rod 20 are formed of a transparent material having a refractive index of 1.51 and the bending prism 18 is formed of a transparent material having a refractive index of 1.8. Moreover, a gap between the LED light emitting surface and the incident surface of the incident rod 16 is 0.25 mm.

In the first rod 12 having such a T-shaped rod structure, when the taper rod 20 is swiveled around its long axis as a rotational axis and the two LEDs 10 corresponding to each incident surface position of the incident rods 16, i.e., a total of the four LEDs 10 are subjected to pulse light emission by using a large current, light beams with a large light intensity are obtained. The light beams taken in from the incident surfaces of the incident rods 16 are led through the incident rods 16, and their light path is changed toward a direction of the taper rod 20 by the bending prisms 18. Then, the parallelism of the light beam angle is increased by the taper rod 20, and the light beams are emitted from the outgoing radiation surface of the taper rod 20 which serves as the outgoing radiation surface 12C of the first rod 12.

The second rod 14 shown in FIG. 7 is configured to have the regular octagonal incident surface whose inscribing circle has a diameter of 5.9 mm, the rectangular outgoing radiation surface having a size of 7.9 mm×5.9 mm, and the length of 20 mm. On the other hand, the second rod 14 shown in FIG. 8 is configured to have the square incident surface having a size of 5.9 mm×5.9 mm, the rectangular outgoing radiation surface having a size of 7.9 mm×5.9 mm and the length of 20 mm, the outgoing radiation surface and the length being equal to those in the example depicted in FIG. 7. Additionally, in both drawings, a gap between the outgoing radiation surface 12C of the first rod 12 and the incident surface 14A of the second rod 14 is 0.3 mm.

An even and bright illumination system with a light beam angle being restricted can be realized by arranging the transmission type LCD 22 or the like in the vicinity of the outgoing radiation surface 14C of the second rod 14. FIG. 7 is compared with FIG. 8 with 7.9 mm×5.9 mm equal to the size of the outgoing radiation surface being determined as an evaluation surface at a position distanced from the second rod outgoing radiation surface by 1 mm. When the LEDs 10 have the luminous intensity distribution characteristics of complete diffusion, light beams, which reach the evaluation surface, of light beams from the four LEDs which simultaneously emit light beams correspond to light beams of the 2.3 LEDs in both FIGS. 7 and 8, i.e., the light beams correspond to 57.5%. Of these light beams, the light beams having a light beam skew angle of 22.3° or below, i.e., the light beams having NA of 0.38 on an image side correspond to the light beams of the 1.51 LEDs (64% of a quantity of light beams which reach the evaluation surface) in FIG. 7, and the same correspond to the light beams of the 1.27 LEDs (56% of a quantity of light beams which reach the evaluation surface) in FIG. 8, and hence there is a difference between the both examples.

Figure 9:
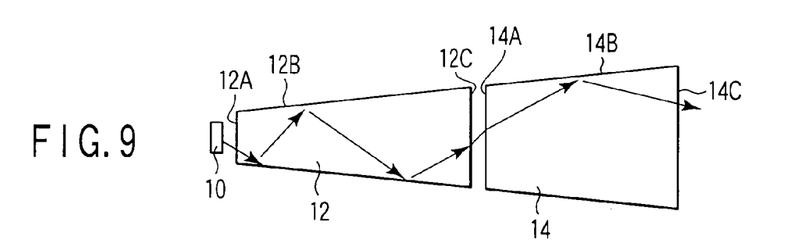
FIG. 9 is a view schematically showing a path of light beams which enter an incident surface of the first rod at the same angle in the structure depicted in FIG. 7.
Figure 10:
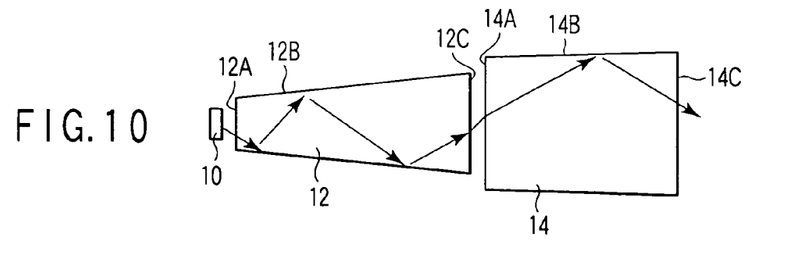
FIG. 10 is a view schematically showing a path of light beams which enter the incident surface of the first rod at the same angle in the structure depicted in FIG. 8.

This is a result from a deteriorated NA conversion efficiency since the incident surface of the second rod 14 has the square shape in FIG. 8, especially the taper angle of the second rod 14 becomes gentle at an edge portion connecting a corner of the square with a corner of the rectangular of the outgoing radiation surface. FIG. 9 is a view schematically showing a path of light beams which entered the incident surface 12A of the first rod 12 at the same angle in case of FIG. 7, and FIG. 10 shows the same in case of FIG. 8. If the size of the outgoing radiation surface 14C of the second rod 14 is the same as described above, since the regular octagonal shape of the outgoing radiation surface 12C of the first rod 12 must be covered when the incident surface 14A of the second rod 14 has the square shape as shown in FIG. 8, the size of the incident surface 14A becomes larger than that in the example shown in FIG. 7 in the diagonal direction. As a result, the taper angle of the second rod becomes shallow as shown in FIG. 10, and a reflection angle of the light beams on the side surface 14B which serves as the reflection surface becomes large. Therefore, even if the light beams enter the second rod 14 at the same angle, the final light beam angle when emitted from the second rod 14 becomes shallow in FIG. 9, whilst large in FIG. 10. Consequently, a quantity of the light beams which are actually applied on the LCD 22 and have a given angle or a smaller angle and the high parallelism becomes smaller in FIG. 10.

Therefore, it is preferable for conversion of the light beam angle that the incident surface 14A of the second rod 14 has an area as small as possible within a range not producing leakage of light beams.

Figure 11:
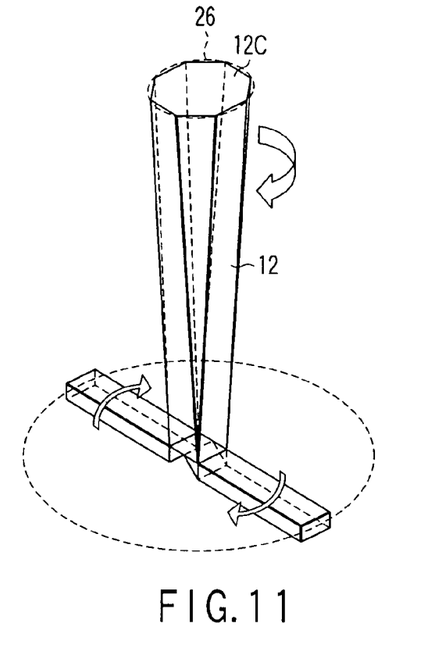
FIG. 11 is a view illustrating a trajectory formed by the outgoing radiation surface when the first rod is rotated.
Figure 12:
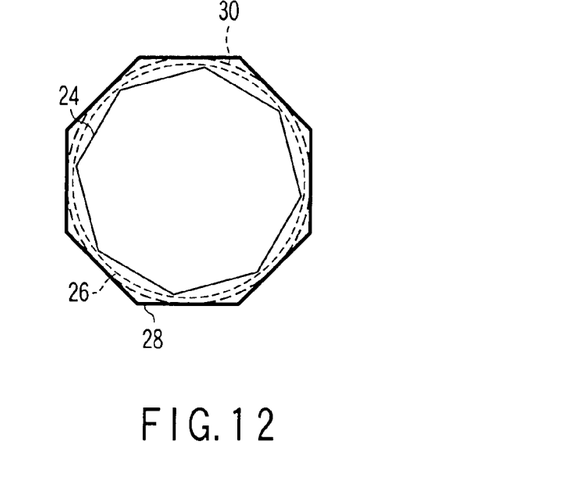
FIG. 12 is a view showing a relationship between a rim of the first rod outgoing radiation surface, a circumscribing circle of the first rod outgoing radiation surface, a rim of the second rod incident surface and an inscribing circle of the second rod incident surface.

As shown in FIG. 11, when the first rod 12 configured as the T-shaped rod is rotated, even if the outgoing radiation surface 12C has the regular octagonal shape, the trajectory becomes a circumscribing circle of an apex of the regular octagonal shape as indicated by a broken line in the drawing. That is, even if the first rod outgoing radiation surface rim 24 has the regular octagonal shape as drawn by thin solid lines in FIG. 12, the trajectory becomes the first rod outgoing radiation surface circumscribing circle 26 as drawn by a thin broken line in the figure when this rod is rotated. It is desired to allow the light beams emitted from an area of such a first rod outgoing radiation surface circumscribing circle 26 to enter without leakage the incident surface 14A of the fixed second rod 14 configured to have the regular octagonal shape like the second rod incident surface rim 28 drawn by a thick solid line in the figure. In order to realize this, such a regular octagonal inscribing circle as shown as the second rod incident surface inscribing circle 30 drawn by a thick broken line in the drawing must be larger than the first rod outgoing radiation surface circumscribing circle 26.

Figure 13:
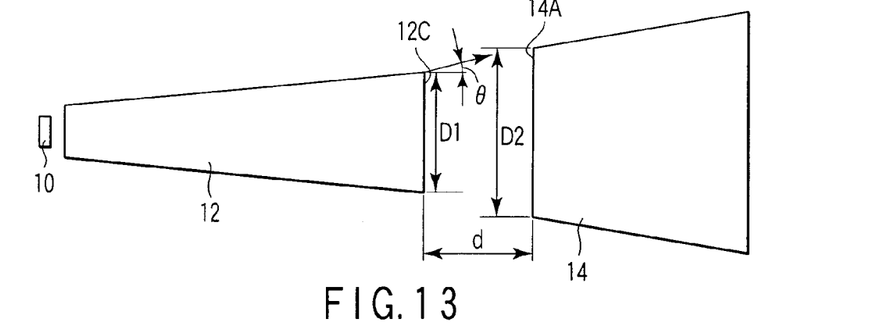
FIG. 13 is a view illustrating definitions of characters in an expression which determines a diameter of the inscribing circle of the second rod incident surface.

In order to realize this, the following condition must be satisfied. Here, as shown in FIG. 13, it is assumed that $D_1$ is the maximum dimension of the outgoing radiation surface 12C of the first rod 12, i.e., a diameter of the first rod outgoing radiation surface circumscribing circle 26, d is a length of a gap between the outgoing radiation surface 12C of the first rod 12 and the incident surface 14A of the second rod 14, and θ is the maximum outgoing radiation angle of the light beams on the outgoing radiation surface 12C of the first rod 12. At this time, the minimum dimension of the incident surface 14A of the second rod 14, i.e., a diameter $D_2$ of the second rod incident surface inscribing circle 30 must be a length satisfying the following expression.

$$D_2 > D_1 + 2d \times \tan\theta$$

By satisfying this condition, when the light beams enter the incident surface 14A of the second rod 14 from the outgoing radiation surface 12C of the first rod, leakage light beams can be substantially eliminated.

Figure 14:
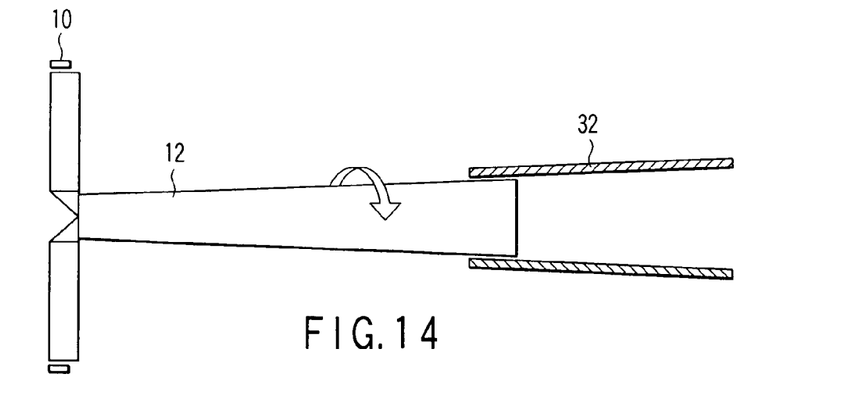
FIG. 14 is a cross-sectional view illustrating a modification using a pipe in place of the second rod.

It is to be noted that the second light leading member on the rear stage of the first rod 12 may be of course formed of a hollow pipe in place of the rod in the optical device having a structure in which the first rod 12 is swiveled. Further, in this case, as shown in FIG. 14, if a pipe 32 as the second light leading member has such a diameter that the first rod outgoing radiation surface circumscribing circle 26 is not brought into contact with the inner wall of the pipe 32, it can overlap in a direction of the rotational axis. As a result, leakage of the light beams does not occur even if the clearance in the direction of the rotational axis mentioned above is not provided. Of course, in this case, the reflection coat on the pipe inner wall surface may be damaged unless the diameter of the pipe 32 is determined while taking an imperfect alignment of the rotational axis, an assembling error, a manufacture error in the first rod 12 or the pipe 32, and others into consideration, and hence attention should be paid.

Third Embodiment

An illumination apparatus including an illumination optical member by which the outgoing radiation surface of the second light leading member and a predetermined irradiation target surface have an optically conjugate positional relationship in addition to the structure explained in conjunction with the second embodiment will now be described as a third embodiment according to the present invention.

Figure 15:
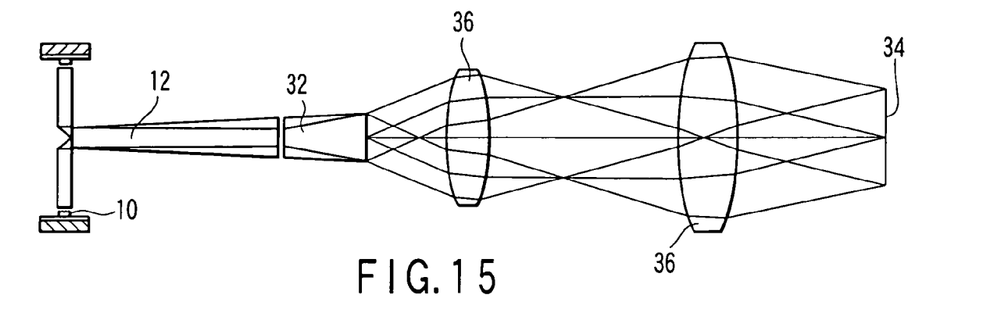
FIG. 15 is a cross-sectional view illustrating a structure of an illumination apparatus in a third embodiment according to the present invention.
Figure 16:
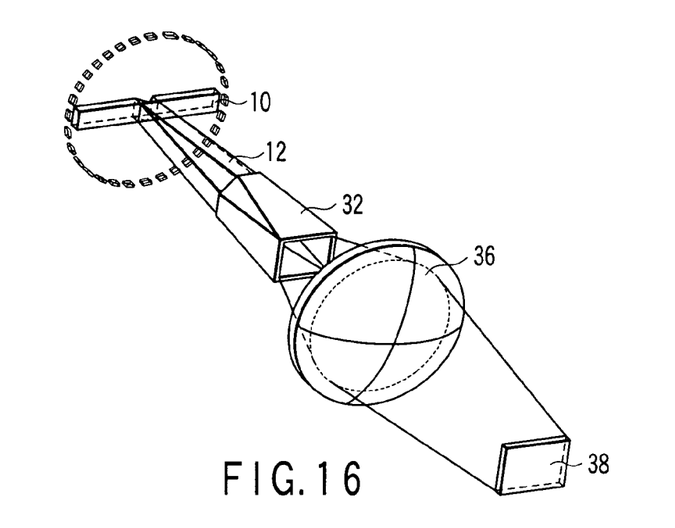
FIG. 16 is a perspective view showing a structure of the illumination apparatus according to the third embodiment.

That is, as shown in FIGS. 15 and 16, like the second embodiment, a tapered pipe 32 in which an incident surface (virtual surface) has a regular octagonal shape and an outgoing radiation surface (virtual surface) has a rectangular shape is fixed and supported as the second light leading member on the rear stage of the T-shaped first rod 12 which leads the light beams emitted from the plurality of LEDs 10 by rotation thereof. Furthermore, the illumination apparatus according to this embodiment comprises an illumination relay lens 36 as an illumination optical member by which the outgoing radiation surface (virtual surface) of the pipe 32 and a predetermined irradiation target surface 34 have an optically conjugate positional relationship. It is to be noted that this illumination relay lens 36 is drawn as two lenses in FIG. 15 while typically drawn as one lens in FIG. 16 which is a perspective view, but a structure of the optical system is no object as long as desired performances can be obtained and the above-described conjugate relationship can be acquired.

Figure 17:
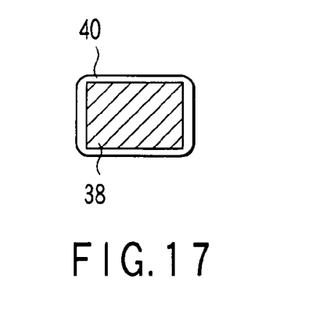
FIG. 17 is a view illustrating a relationship between a display element and an irradiation area.

According to the illumination apparatus having such a structure, a rectangular image of the outgoing radiation surface (virtual surface) of the pipe 32 is relayed through the illumination relay lens 36 and adjusted to be equal to the size of the irradiation target surface 34. By adopting such a structure, as shown in FIG. 17, an inverted irradiation area 40 can be given to a rectangular display element 38 arranged on the irradiation target surface 34 as shown in FIG. 17. Incidentally, when an anamorphic optical system is used as the illumination relay lens 36, it is good enough to determine an aspect of the pipe 32 with which such an irradiation area 40 as shown in FIG. 17 can be obtained while taking the anamorphic power into consideration.

Figure 18A:
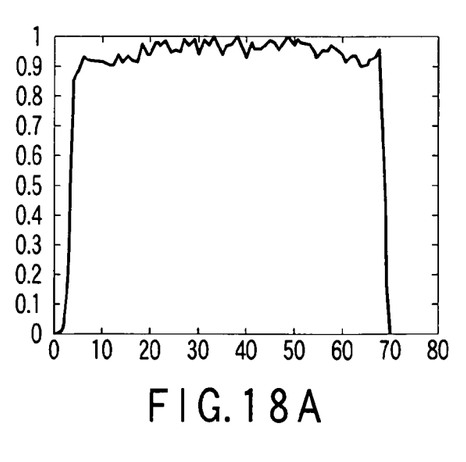
FIG. 18A is a view showing an example of a spatial intensity distribution in a horizontal central cross section on an irradiation target surface.
Figure 18B:
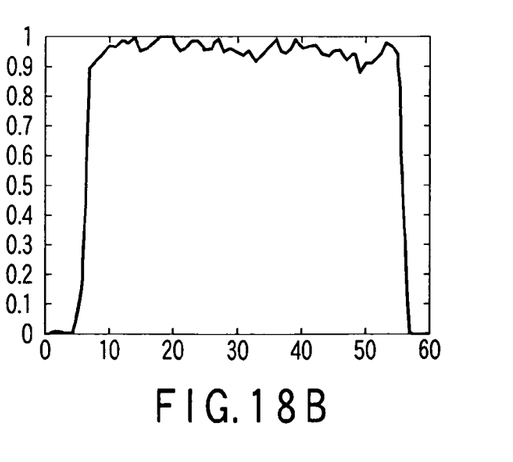
FIG. 18B is a view showing an example of the spatial intensity distribution in a vertical central cross section on the irradiation target surface.

FIGS. 18A and 18B are views two-dimensionally showing an example of a spatial intensity distribution on a central cross section of the irradiation target surface 34 on which the display element 36 in FIG. 16 is arranged. That is, FIG. 18A shows a horizontal cross-sectional distribution, and FIG. 18B shows a vertical cross-sectional distribution, respectively. Moreover, in these drawings, a horizontal axis represents a position in each of horizontal/vertical directions when a basic point is placed at the lower left of the display element 38 depicted in FIG. 16, and a vertical axis represents an intensity. It is to be noted that a long side of the display element 38 corresponds to the horizontal direction.

The evenness of the intensity distribution, i.e., illumination irregularities relate to lengths of the incident rod 16, the taper rod 20 and the pipe 32 constituting the first rod 12. That is, when the lengths are longer, the intensity distribution homogenizing effect becomes high as the number of times of reflections on side surfaces of the incident rod 16, the taper rod 20 and the pipe 32 becomes large. Therefore, a specification of each optical element is determined so that a desired illumination irregularity level can be obtained. At this time, since the light sources (LEDs) 10 are arranged at intervals as shown in FIG. 16, attention should be paid to the fact that a relative position of the LEDs 10 and the incident surface of the incident rod 16 periodically varies when taking in the light beams by rotating the first rod 12. Since the illumination irregularities on the irradiation target surface 34 also vary due to a change in this relative positional relationship with time, determination of the specification or evaluation is required taking this change into consideration.

Here, a brief description will be given as to an actual structure of the rotation mechanism of the first rod 12 and an electrical structure of the illumination apparatus with reference to FIGS. 19 and 20.

That is, in this illumination apparatus, the first rod attached to a rod holder 42 which is a holder capable of swiveling is rotated by a rotary motor 44, and the plurality of LEDs 10 arranged on an inner periphery of an illuminant substrate 46 formed into a drum-like shape are sequentially turned on with the rotation of the first rod 12.

It is to be noted that the incident rods 16, the bending prisms 18 and the taper rod 20 constituting the first rod 12 do not have to have the same refractive index. Here, when the refractive index of the bending prisms 18 is higher than those of the incident rods 16 and the taper rod 20, a quantity of light beams leaking from the side surfaces of the members can be reduced, which is desirable. When the refractive index of the bending prisms 18 is set high, of the light beams which have been transmitted through the bending prisms 18, the light beams having the angle at which the light beams are transmitted without being reflected on the side surface the incident rods 16 or the taper rod 20 can be reflected on a bonded surface between the incident rod 16 and the bending prism 18 or a bonded surface between the taper rod 20 and the bending prism 18 to advance into the bending prism 18. As a result, a quantity of light beams leaking from the side surfaces of the members can be reduced.

It is to be noted that a predetermined number of the LEDs 10 having luminous colors of red (R), green (G) and blue (B) are determined as one set, and two sets of such LEDs 10 are arranged on the inner periphery of the illuminant substrate 46 having the drum-like shape.

Figure 19:
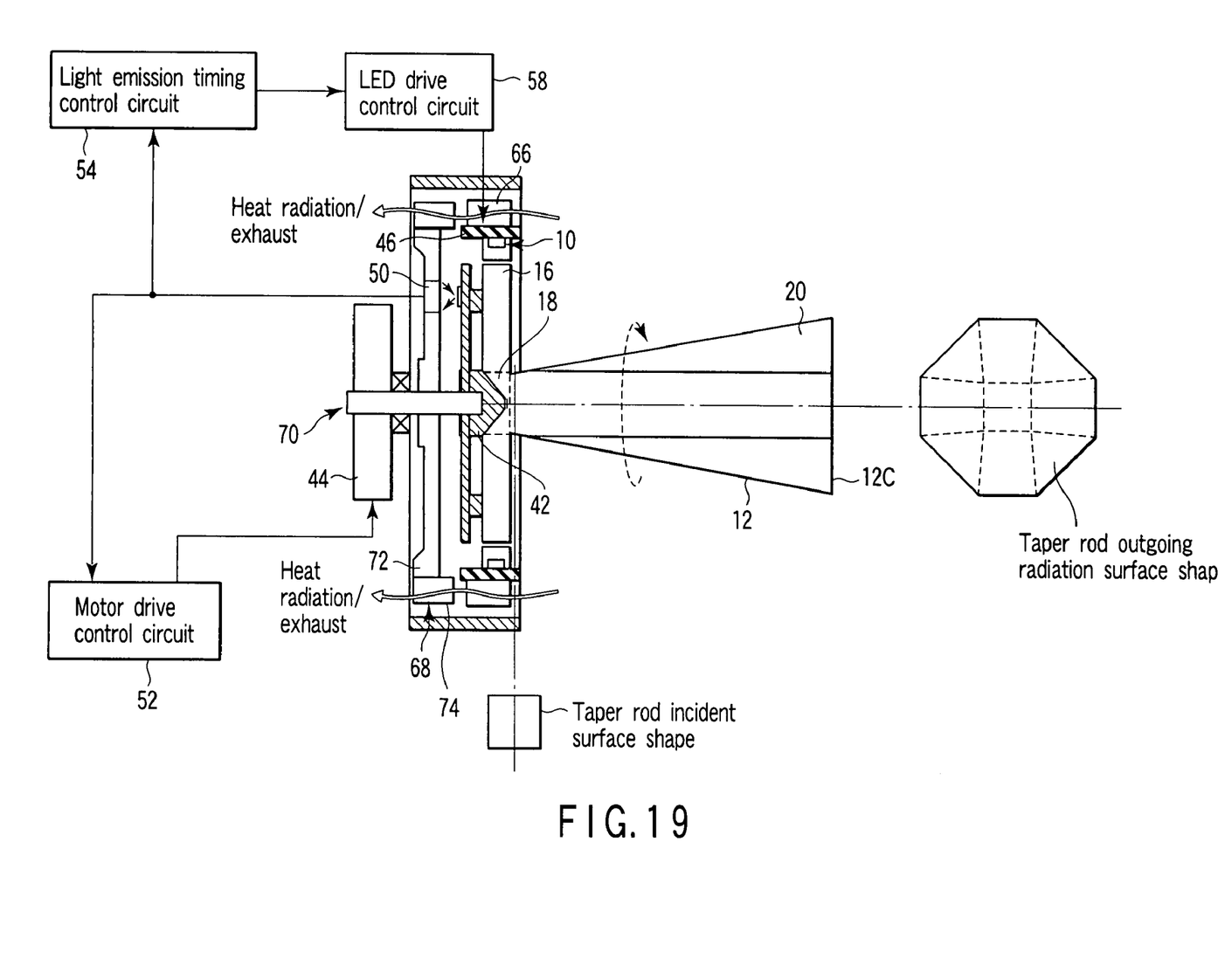
FIG. 19 is a view showing an actual structure of a rotation mechanism for the first rod of the illumination apparatus in the third embodiment.
Figure 20:
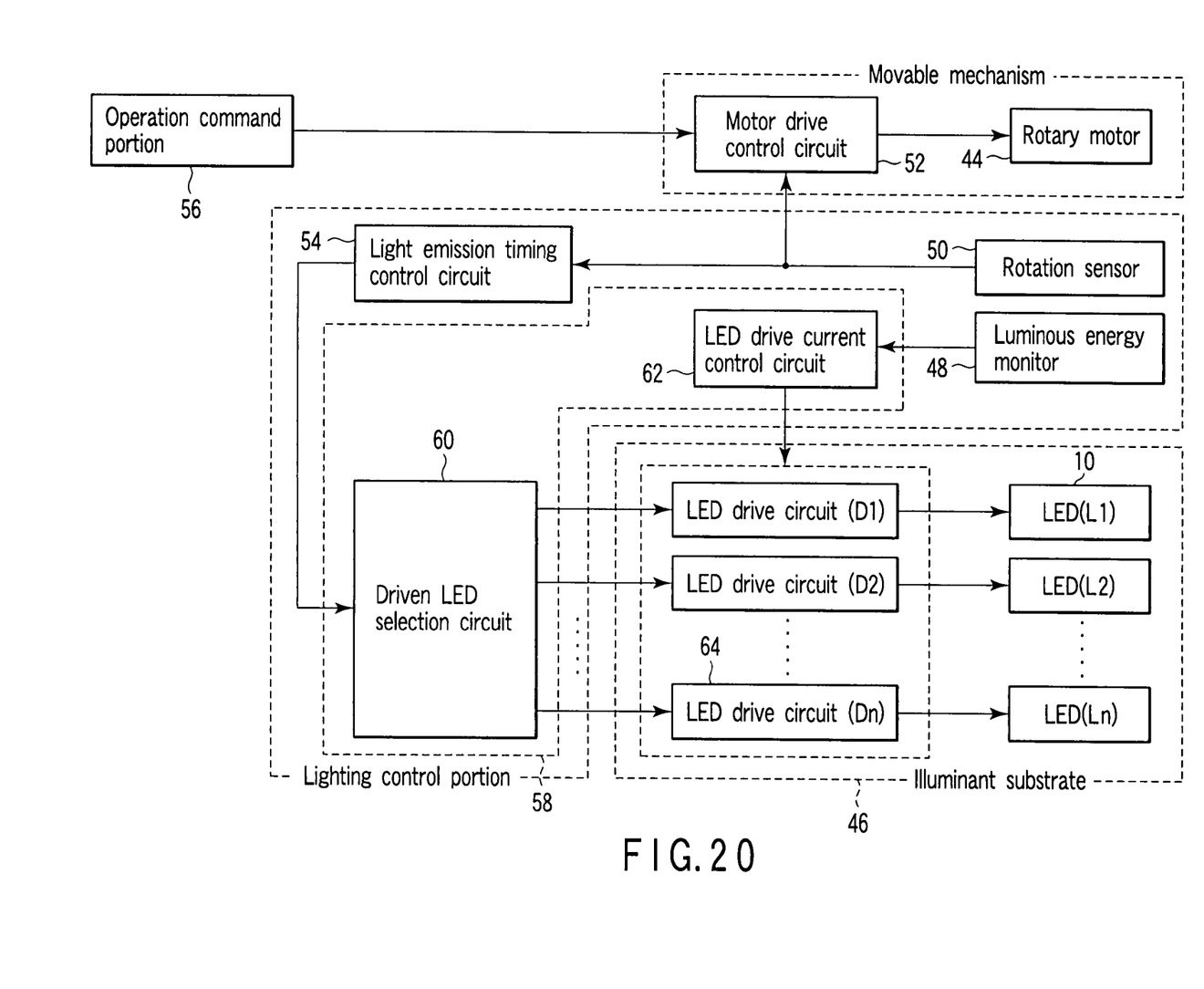
FIG. 20 is a block diagram showing an electrical structure of the illumination apparatus in the third embodiment.

Further, the pipe 32 and the illumination relay lens 36 are fixed and supported on the rear stage of the outgoing radiation surface 12C of the first rod 12, but they are not shown in FIG. 19 for simplification. Furthermore, although not shown in FIG. 19, a light leading plate and a plurality of micro reflection prisms are arranged in the vicinity of the outgoing radiation surface of the first rod 12, light beams which entered the micro reflection prisms of light beams emitted from the first rod 12, i.e., incident light beams which entered the light leading plate are partially reflected by the micro reflection prisms, and the remaining light beams enter the pipe 32 as the outgoing beams. Moreover, the reflected light beams from the micro reflection prisms are led to a luminous energy monitor 48 by the light leading plate, and a luminous energy is detected by this light intensity monitor 48.

Additionally, a rotation sensor 50 which detects a rotation position of the rod holder 42 is arranged at a position in the vicinity of the back side of the rod holder 42. As this rotation sensor 50, it is possible to utilize, e.g., a sensor which has a photo reflector and detects one revolution of the rod holder 42 by detecting light beams reflected by a reflector plate attached on the back side of the rod holder 42. A rotation position detection signal obtained by this rotation sensor 50 is input to a motor drive control circuit 52 and a light emission timing control circuit 54.

Here, the motor drive control circuit 52 controls the rotary motor 44, and forms a movable mechanism which rotatably drives the first rod together with the rotary motor 44. That is, when an operation start signal is input from an operation command portion 56 in accordance with a button operation or the like by a user, the motor drive control circuit 52 starts rotation of the rotary motor 44. Then, it drives and controls the rotary motor 44 to rotate at a fixed speed in accordance with a rotation position detection result of the rod holder 42 by the rotation sensor 50.

Further, the light emission timing control circuit 54, as well as the luminous energy monitor 48, the rotation sensor 50 and the LED drive control circuit 58 to which a luminous energy detection result obtained by the luminous energy monitor 48 is input, forms a lighting control portion which controls a light emission timing of the plurality of LEDs 10. It is to be noted that the LED drive control circuit 58 comprises a driven LED selection circuit 60 and an LED drive current control circuit 62. That is, the light emission timing control circuit 54 generates a timing signal based on detection of a rotation position of the rod holder 42 by the rotation sensor 50, and inputs it to the driven LED selection circuit 60 of the LED drive control circuit 58. This drive LED selection circuit 60 selectively supplies a drive control signal to each LED drive circuit 64 which is used to drive each LED 10 mounted on the illuminant substrate 46 in accordance with a timing signal input thereto. The driven LED selection circuit 60 controls to sequentially turn on the LED 10 which is placed at the position of the incident surface of the first rod 12, i.e., the incident surface of the incident rod 16 in this manner. Furthermore, at this time, the LED drive current control circuit 62 of the LED drive control circuit 58 controls a drive current of the LED 10 of the LED drive circuit 64 in such a manner that a luminous energy of the LED 10 becomes optimum in accordance with an increase/decrease in the outgoing beams whose luminous energy was detected by the luminous energy monitor 48.

It is to be noted that a heat slinger 66 is provided on an outer periphery of the drum-like illuminant substrate 46. When heat generated with light emission of the LEDs 10 is radiated by using this heat slinger 66, changes in characteristics of the LEDs 10 due to heat can be avoided, thereby obtaining stable illumination even if the illumination apparatus is continuously operated. Moreover, a heat radiation fan 68 as a heat radiating/exhausting member used to exhaust air which is in contact with the heat slinger 66 is also provided. Here, the heat radiation fan 68 has a structure in which a plurality of fins 72 are attached on an outer peripheral surface of a fin attachment member 70 at predetermined intervals at such an angle that a direction of heat radiation/exhaustion is set on the rotary motor 44 side. The fin attachment member 70 is coupled with a rotary shaft 74 of the rotary motor 44 used to rotate the first rod 12, i.e., the rod holder 42. Therefore, when the first rod 12 is rotated by the rotary motor 44, the heat radiation fan 68 simultaneously rotates, thereby exhausting air which is in contact with the heat slinger 66.

As described above, in the illumination apparatus according to this embodiment, the plurality of LEDs 10 are sequentially switched and subjected to pulse light emission, and a relative positional relationship with the first rod 12 which takes in emitted light beams is selected and shifted in accordance with switching of light emission of the LEDs 10. In the process of one revolution of the first rod 12, a color of the light beams to be emitted is changed in the order of red (R), blue (B), green (G), red (R), blue (B) and green (G), and the high-luminance three-color LEDs can be effectively obtained. Therefore, the three-color light beams which has a large luminous energy and the improved parallelism are obtained from the outgoing radiation surface 12C of the first rod 12. It is to be noted that the order of the light emission colors is not restricted to the above, and it may be appropriately set.

It is needless to say that the solid second rod 14 may be used as the second light leading member in place of the pipe 32 in the third embodiment. Since light beams are led by total reflection in case of the solid rod, the rod has a higher reflection efficiency on the reflection surface than the pipe. Therefore, the optical device with the good light transmission efficiency can be realized by elongating the rod beyond the pipe. However, in case of the illumination method by which the outgoing radiation surface is conjugate with the irradiation target surface 34 like this embodiment, there occurs a problem that an image of dust or the like attached on the outgoing radiation surface of the rod is enlarged and becomes noticeable. On the other hand, in case of the pipe, dust or the like is hard to become a problem, but a quantity of light corresponding to a reflection factor of the reflection coat is lost every time light beams are reflected on the inner wall surface. Therefore, which one of the rod and the pipe is used may be determined in accordance with a structure or an intended use of the actual apparatus.

Additionally, in regard to the shape of the incident surface (virtual) of the pipe 32, a circular shape or a quasi-circular shape which is a shape having the number of angles as a multiple of 4, e.g., an octagon or a hexadecagon is desirable since it has the excellent productivity.

Fourth Embodiment

A projector using the illumination apparatus explained in conjunction with the third embodiment will now be described as a fourth embodiment according to the present invention.

Figure 21:
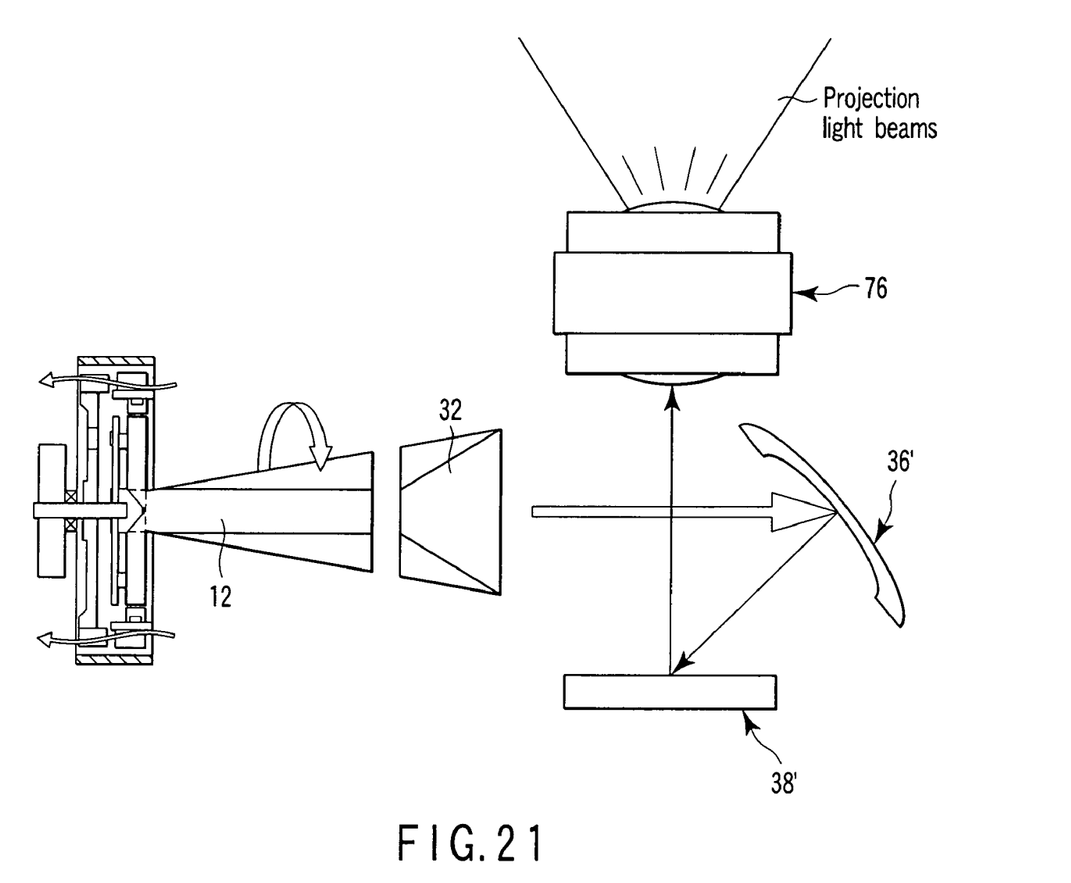
FIG. 21 is a view showing a structure of a projector in a fourth embodiment according to the present invention.

That is, as shown in FIG. 21, light beams emitted from an outgoing radiation surface (virtual surface) of a pipe 32 as the second light leading member of the above-described illumination apparatus are reflected on a reflection mirror 36' as an illumination optical member. Further, they are allowed to enter DMD (registered trade mark of Texas Instruments, Inc. in U.S.A.) 38' which is a reflection type display element 38 arranged on a predetermined irradiation target surface having an optically conjugate positional relationship with the outgoing radiation surface and modulated, and thereafter they are outputted as projection light beams through a projection lens 76. It is to be noted that the DMD 38' is a two-dimensional micromirror deflection array, and its detail is disclosed in, e.g., Jpn. Pat. Appln. KOKAI Publication No. 11-32278 or U.S. Pat. No. 6,129,437, thereby eliminating its explanation.

In this case, a critical illumination system is formed by a reflection mirror 36' with a curved shape which is designed in such a manner that emitted light beams from the illumination apparatus and incident light beams on a light receiving surface of the DMD 38' form an image formation relationship. The light receiving surface of the DMD 38' has a rectangular shape, and an outgoing radiation surface (virtual surface) of a pipe 32 also has a quadrangle in accordance with an aspect ratio of that shape. According to this structure, since an illumination light path is folded, it can be accommodated in a space-saving manner. It is to be noted that the light path is designed in such a manner that so-called off light beams when not allowed to enter the projection lens 76 from the DMD 38' by a modulation operation of the DMD 38' are not allowed to strike on the reflection mirror 36' and the outgoing radiation surface (virtual surface) of the pipe 32 of the illumination apparatus.

The bright projector with the good efficiency can be provided by adopting such a structure.

Although the above has described the present invention based on the embodiments, the present invention is not restricted to the foregoing embodiment, and it is needless to say that various modifications or applications can be carried out within a range of the scope of the invention. For example, when the projector using the illumination apparatus according to the present invention is applied to a constituent part which projects an image in an exposure apparatus for photographs, a color copying machine, a color printer, a rewritable electronic paper recording apparatus or the like, it can be effective image forming means since color adjustment is easy.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical device which leads light beams emitted by a light source to a predetermined illumination area, comprising:
  a first light leading member including:
    a first incident surface configured to be entered the light beams emitted by the light source;
    a first reflection surface comprising at least one surface configured to reflect a part of the light beams which enter the first incident surface; and
    a first outgoing radiation surface configured to emit the light beams reflected on the first reflection surface and a part of the light beams which enter the first incident surface, the first outgoing radiation surface having a shape different from that of the first incident surface; and
  a second light leading member including:
    a second incident surface configured to be entered the light beams emitted from the first outgoing radiation surface of the first light leading member;
    a second reflection surface comprising at least one surface configured to reflect a part of the light beams which enter the second incident surface; and
    a second outgoing radiation surface configured to emit the light beams reflected on the second reflection surface and a part of the light beams which enter the second incident surface, the second outgoing radiation surface having a shape different from that of the second incident surface;
  wherein the first light leading member relatively swivels with respect to the second light leading member,
  a diameter of a circumscribing circle of the first outgoing radiation surface shape in the first light leading member is not more than a diameter of an inscribing circle of the second incident surface shape in the second light leading member, and
  a center of swiveling when the first light leading member relatively swivels with respect to the second light leading member is substantially the same as a center of the circumscribing circle and the inscribing circle.

2. The device according to claim 1, wherein
the first outgoing radiation surface of the first light leading member is opposed to the second incident surface of the second light leading member with a gap therebetween, and
a diameter $D_2$ of the inscribing circle of the second incident surface shape in the second light leading member is a length satisfying the following expression:

$$D_2 > D_1 + 2d \times \tan\theta$$

where $D_1$ is a diameter of the circumscribing circle of the first outgoing radiation surface shape in the first light leading member, d is a length of the gap, and $\theta$ is a maximum outgoing radiation angle of the light beams on the first outgoing radiation surface of the fist light leading member.

3. The device according to claim 1, wherein one of the first light leading member and the second light leading member is formed of a solid rod, and the other one of the same is formed of a hollow pipe having a reflection surface on an inner surface thereof.

4. The device according to claim 3, wherein a distance between the incident surface and the outgoing radiation surface of the light leading member formed of the solid rod is longer than a distance between the incident surface and the outgoing radiation surface of the light leading member formed of the hollow pipe.

5. The device according to claim 1, wherein the first light leading member has a tapered shape in which the first outgoing radiation surface is larger than the first incident surface, and
the second light leading member also has a tapered shape in which the second outgoing radiation surface is larger than the second incident surface.

6. The device according to claim 1, wherein
the first light leading member has a tapered shape in which the first outgoing radiation surface is larger than the first incident surface, and
the second light leading member has an inverse-tapered shape in which the second outgoing radiation surface is smaller than the second incident surface.

7. The device according to claim 1, wherein
the first light leading member has an inverse-tapered shape in which the first outgoing radiation surface is smaller than the first incident surface, and
the second light leading member has a tapered shape in which the second outgoing radiation surface is larger than the second incident surface.

8. The device according to claim 1, wherein the first outgoing radiation surface of the first light leading member is opposed to the second incident surface of the second light leading member with a gap therebetween.

9. The device according to claim 8, wherein a minimum dimension $D_2$ of the second incident surface of the second light leading member is a length satisfying the following expression:

$$D_2 > D_1 + 2d \times \tan\theta$$

where $D_1$ is a maximum dimension of the first outgoing radiation surface of the first light leading member, d is a length of the gap, and $\theta$ is a maximum outgoing radiation angle of light beams on the first outgoing radiation surface of the first light leading member.

10. The device according to claim 9, wherein
the $D_1$ is a diameter of a circumscribing circle of the first outgoing radiation surface shape in the first light leading member, and
the $D_2$ is a diameter of an inscribing circle of the second incident surface shape in the second light leading member.

11. An optical device which leads light beams emitted by a light source to a predetermined illumination area, comprising:
a first light leading member including:
a first incident surface configured to be entered the light beams emitted by the light source;
a first reflection surface comprising at least one surface configured to reflect a part of the light beams which enter the first incident surface; and
a first outgoing radiation surface configured to emit the light beams reflected on the first reflection surface and a part of the light beams which enter the first incident surface, the first outgoing radiation surface having a shape different from that of the first incident surface; and
a second light leading member including:
a second incident surface configured to be entered the light beams emitted from the first outgoing radiation surface of the first light leading member;
a second reflection surface comprising at least one surface configured to reflect a part of the light beams which enter the second incident surface; and
a second outgoing radiation surface configured to emit the light beams reflected on the second reflection surface and a part of the light beams which enter the second incident surface, the second outgoing radiation surface having a shape different from that of the second incident surface;
wherein the first incident surface shape in the first light leading member is a quadrangle,
the first outgoing radiation surface shape in the first light leading member is one of a circle and a polygon having five or more angles, and
the first outgoing radiation surface shape in the first light leading member is similar to the second incident surface shape in the second light leading member.

12. An optical device which leads light beams emitted by a light source to a predetermined illumination area, comprising:
a first light leading member including:
a first incident surface configured to be entered the light beams emitted by the light source;
a first reflection surface comprising at least one surface configured to reflect a part of the light beams which enter the first incident surface; and
a first outgoing radiation surface configured to emit the light beams reflected on the first reflection surface and a part of the light beams which enter the first incident surface, the first outgoing radiation surface having a shape different from that of the first incident surface; and
a second light leading member including:
a second incident surface configured to be entered the light beams emitted from the first outgoing& radiation surface of the first light leading member;
a second reflection surface comprising at least one surface configured to reflect a part of the light beams which enter the second incident surface; and
a second outgoing radiation surface configured to emit the light beams reflected on the second reflection surface and a part of the light beams which enter the second incident surface, the second outgoing radiation surface having a shape different from that of the second incident surface;

wherein the second outgoing radiation surface shape in the second light leading member is a quandrangle, and the second incident surface shape in the second light leading member is one of a circle and a polygon having five or more angles.

13. The device according to claim 12, wherein the first outgoing radiation surface shape in the first light leading member is similar to the second incident surface shape in the second light leading member.

14. An optical device which leads light beams emitted by a light source to a predetermined illumination area, comprising:
a first light leading member including:
a first incident surface configured to be entered the light beams emitted by the light source;
a first reflection surface comprising at least one surface configured to reflect a part of the light beams which enter the first incident surface; and
a first outgoing radiation surface configured to emit the light beams reflected on the first reflection surface and a part of the light beams which enter the first incident surface, the first outgoing radiation surface having a shape different from that of the first incident surface; and
a second light leading member including:
a second incident surface configured to be entered the light beams emitted from the first outgoing radiation surface of the first light leading member;
a second reflection surface comprising at least one surface configured to reflect a part of the light beams which enter the second incident surface; and
a second outgoing radiation surface configured to emit the light beams reflected on the second reflection surface and a part of the light beams which enter the second incident surface, the second outgoing radiation surface having a shape different from that of the second incident surface;
wherein the first incident surface shape in the first light leading member and the second outgoing radiation surface shape in the second light leading member are quadrangles.

15. The device according to claim 14, wherein the first outgoing radiation surface shape in the first light leading member is similar to the second incident surface shape in the second light leading member.

16. A projector comprising:
an illumination apparatus which illuminates a predetermined irradiation target surface, including:
a light source configured to emit light beams;
an optical device which leads light beams emitted by the light source to a predetermined illumination area, comprising:
a first light leading member including:
a first incident surface configured to be entered the light beams emitted by the light source;
a first reflection surface comprising at least one surface configured to reflect a part of the light beams which enter the first incident surface; and
a first outgoing radiation surface configured to emit the light beams reflected on the first reflection surface and a part of the light beams which enter the first incident surface, the first outgoing radiation surface having a shape different from that of the fist incident surface; and
a second light leading member including:
a second incident surface configured to be entered the light beams emitted from the first outgoing radiation surface of the first light leading member;
a second reflection surface comprising at least one surface configured to reflect a part of the light beams which enter the second incident surface; and
a second outgoing radiation surface configured to emit the light beams reflected on the second reflection surface and a part of the light beams which enter the second incident surface, the second outgoing radiation surface having a shape different from that of the second incident surface; and
an illumination optical member configured to have an optically conjugate positional relationship between the second outgoing radiation surface of the second light leading member in the optical device and the predetermined irradiation target surface;
a display device arranged on the irradiation target surface; and
a projection optical system configured to project an image formed by the display device onto a screen,
the light source being an LED which emits light beams from a light emission surface thereof, and
both the first incident surface shape in the first light leading member and light emission surface shape of the LED being quadrangles.

17. A projector comprising:
an illumination apparatus for illuminating a predetermined irradiation target surface, including:
a light source for emitting light beams;
an optical device for leading light beams emitted by the light source to a predetermined illumination area, including:
first light leading means including:
a first incident surface for being entered the light beams emitted by the light source;
a first reflection surface comprising at least one surface for reflecting a part of the light beams which enter the first incident surface; and
a first outgoing radiation surface for emitting the light beams reflected on the first reflection surface and a part of the light beams which enter the first incident surface, the first outgoing radiation surface having a shape different from that of the first incident surface; and
second light leading means including:
a second incident surface for being entered the light beams emitted from the first outgoing radiation surface of the first light leading means;
a second reflection surface comprising at least one surface for reflecting a part of the light beams which enter the second incident surface; and
a second outgoing radiation surface for emitting the light beams reflected on the second reflection surface and a part of the light beams which enter the second incident surface, the second outgoing radiation surface having a shape different from that of the second incident surface; and
illumination optical means for having an optically conjugate positional relationship between the second outgoing radiation surface of the second light leading member in the optical device and the predetermined irradiation target surface;
a display device arranged on the irradiation target surface; and
a projection optical system for projecting an image formed by the display device onto a screen,
the light source being an LED which emits light beams from a light emission surface thereof, and
both the first incident surface shape in the first light leading means and a light emission surface shape of the LED being quandrangles.

* * * * *